US007176585B2

(12) United States Patent
Fehr

(10) Patent No.: US 7,176,585 B2
(45) Date of Patent: Feb. 13, 2007

(54) POWER DISTRIBUTION WEB NODE AND POWER MANAGEMENT PROCESS

(75) Inventor: Walton Fehr, Mundelein, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 459 days.

(21) Appl. No.: 10/747,790

(22) Filed: Dec. 29, 2003

(65) Prior Publication Data

US 2005/0140209 A1    Jun. 30, 2005

(51) Int. Cl.
  *B60L 1/00*    (2006.01)
  *B60L 3/00*    (2006.01)
  *H02J 9/00*    (2006.01)
(52) U.S. Cl. .......................... 307/9.1; 307/23; 307/29; 307/80; 307/82
(58) Field of Classification Search ................ 307/9.1, 307/23, 29, 80, 82
  See application file for complete search history.

(56) References Cited

U.S. PATENT DOCUMENTS

| | | | | |
|---|---|---|---|---|
| 4,593,349 A | * | 6/1986 | Chase et al. ................ 713/330 |
| 6,476,519 B1 | * | 11/2002 | Weiner ......................... 307/66 |
| 6,838,783 B2 | * | 1/2005 | Stierle et al. ............... 307/10.1 |
| 6,965,818 B2 | * | 11/2005 | Koenig et al. ................ 701/36 |
| 2002/0091955 A1 | * | 7/2002 | Christopher ................. 713/323 |
| 2003/0009702 A1 | * | 1/2003 | Park ........................... 713/300 |
| 2004/0080212 A1 | * | 4/2004 | Becker et al. ............. 307/10.1 |
| 2004/0156220 A1 | * | 8/2004 | Kim et al. .................... 363/97 |
| 2005/0023898 A1 | | 2/2005 | Eckert | |

* cited by examiner

*Primary Examiner*—Brian Sircus
*Assistant Examiner*—Hal I. Kaplan
(74) *Attorney, Agent, or Firm*—Kevin D. Wills; Terri S. Hughes; Gary J. Cunningham

(57) ABSTRACT

A power management device (200) and a method for use in a power distribution network (100) receives electrical energy and first determines if the power is a primary or secondary power source. When a secondary power source, the power management device (200) waits in standby mode, but when the power is primary power source the power management device (200) configures itself to route power to another node in the power distribution network (100). Power levels and faults within the network can be monitored and controlled by a central controller. Likewise loads (218, 220) may then be powered on as determined by a central controller to reduce LdI/dt voltage spikes and other undesirable side effects.

20 Claims, 4 Drawing Sheets

POWER DISTRIBUTION WEB NODE AND POWER MANAGEMENT PROCESS

CROSS-REFERENCE TO RELATED APPLICATIONS

This application is related to U.S. patent application Ser. No. 10/439,702, filed May 16, 2003, the disclosure of which is hereby incorporated herein by reference in its entirety for all purposes.

TECHNICAL FIELD

This patent relates to vehicles and more particularly to a power and communication architecture for a vehicle.

BACKGROUND

Vehicle builders have been using serial communication (multiplexing) between controllers to share information and distribute control for some time. Doing so has greatly reduced the amount of cross-vehicle signal wiring in the vehicle's electrical distribution system (EDS) needed to implement the comfort, convenience, and safety features desired in modern vehicles.

However, not much has been done to simplify the power and ground distribution part of the EDS. Batteries and alternators (power sources) are usually used to provide power to the vehicle. To distribute the power, the positive side of the power source is connected to fuse blocks that are located in the engine compartment or the passenger compartment of the vehicle. The fuse blocks serve as distribution points for power feed to devices, e.g., actuators, sensors and control elements. The fuse blocks also house the protection devices, circuit breakers and fuses, for the power feeds. The minus side of the power source is often connected to the metal components of the vehicle (body, chassis, engine block, etc.) which then serve as the ground return path from all of the active elements.

Control of the devices in the vehicle to implement desired features is divided into controllers by function or by location (engine, navigation, passenger seat, driver seat, door, etc.). The controller in each of the zones shares information with other controllers using a shared-access serial bus. The bus usually follows an industry standard such as J1850, CAN, MOST. Multiple, independent busses may be used. In that case, one of the controllers acts as a gateway for information between the incompatible busses. Each make and model of vehicle tends to have a unique collection of controllers and devices. Vehicle manufactures also tend to use proprietary serial busses. As a result, each vehicle's EDS must be uniquely designed. Even though many signal wires have been saved by using serial busses, there is another opportunity to improve the efficiency of the EDS if power and ground distribution is dealt with as well.

An alternative architecture introduces the idea of dividing the vehicle into geographic regions and locating a single controller for all of the features in that region. This architecture may also include the concept of smart peripherals to reduce the number of interconnections in localized areas of the vehicle. The smart peripherals use simple serial communication busses such as Local Interconnect Network ("LIN") to relay information from sensors to the zone controller or to accept actuator commands from the zone controller. The zone controllers also act as power and ground distribution points for the smart peripherals.

Another alternative architecture incorporates a junction block that can be located in various zones of the vehicle. The junction block provides a mechanical and electrical connection point for power, ground and communication for small devices that are used to interface to input and output devices. The junction block also provides over current protection devices for the small connected devices, and multiple power sources distributed at different levels within the system.

Existing power, ground and control distribution architectures, while offering elements of flexibility, still require vehicle specific wiring harnesses and rigid power distribution structure and control. Moreover, these existing structures have not addressed signal wiring complexity in localized areas. Thus there is needed a flexible power, ground and control distribution architecture for the entire vehicle that is also adaptable to localized areas of the vehicle.

BRIEF DESCRIPTION OF THE DRAWINGS

This disclosure will describe several embodiments to illustrate its broad teachings. Reference is also made to the attached drawings.

DETAILED DESCRIPTION

Figure 1:
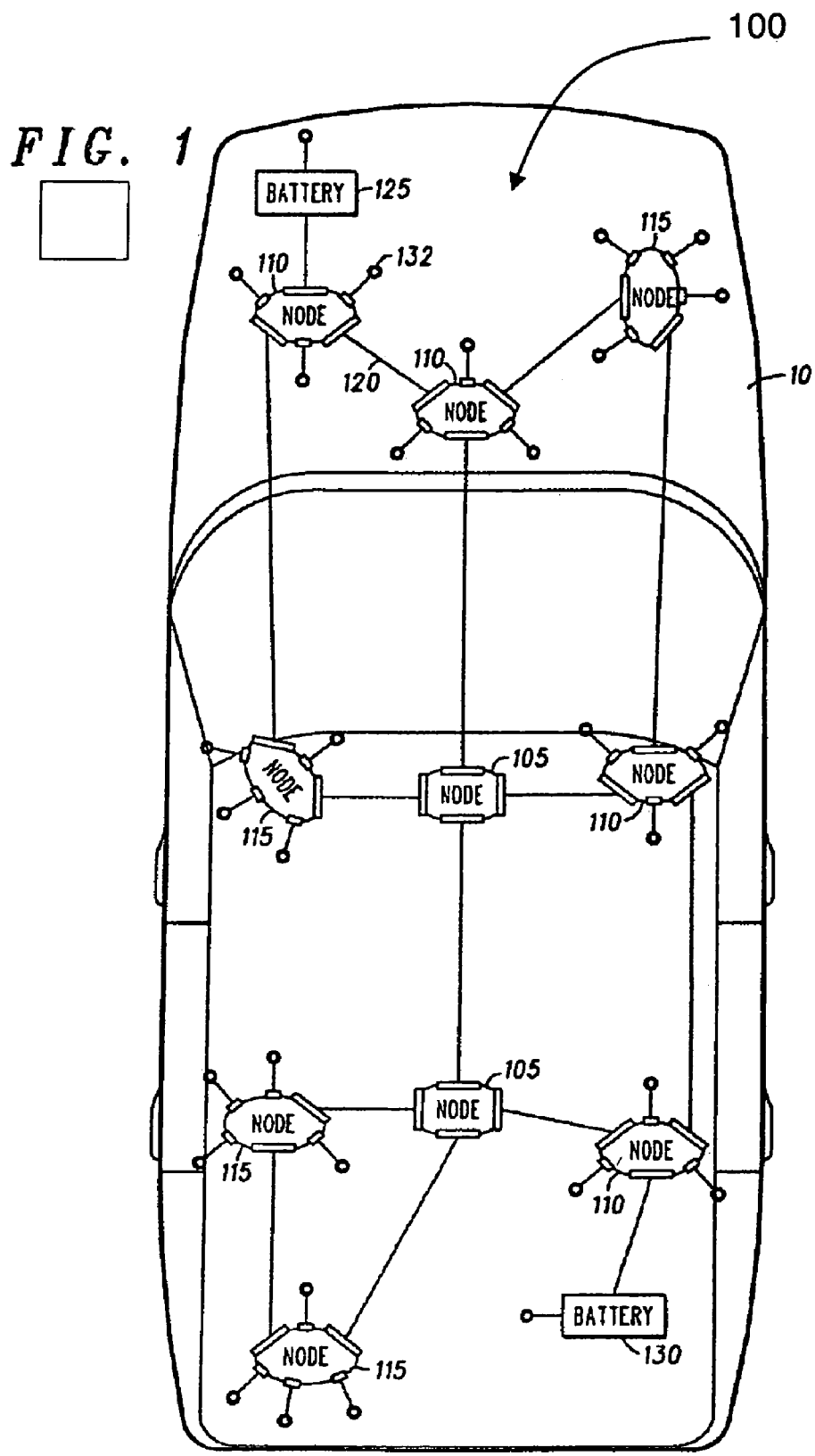
FIG. 1 is a schematic illustration of a communication and power distribution architecture.

A power, ground and communication architecture utilizes hubs in place of zone controllers and fuse blocks. The architecture is particularly adapted for use in vehicles, such as automobiles and trucks, but may be adapted to numerous other applications. Each hub contains computing, communication and power distribution elements. Hubs may be connected to multiple other hubs to distribute communication and power in a freeform, web-type arrangement. Specific tree, bus or star arrangements are not required. Standardized wiring harness segments can be used to join the hubs and other control elements.

Each of the strands in the web may be considered an independent point-to-point bus, isolated power line and ground path. Each of the hubs may contain computing capability to implement vehicle feature applications as well as the signaling devices, e.g., packet routers, circuit switches, and the like, and power protection devices, needed for communication and power distribution. The power distribution architecture may be joined with the intelligence and communication capability of the signaling network to provide enhanced fault management and communication. The power distribution and signaling network may be adapted to cooperate to monitor the power distribution medium, to detect and diagnose faults and to communicate this information to other controllers and other areas of the power distribution network. The web-type arrangement of the architecture allows potentially for dynamic rearrangement to effect repairs in the event of a power fault.

The individual computing capability that may exist in the hubs or nodes and the communication infrastructure associated with the communication and power distribution architecture may be used to set the function and configuration of each hub or node. Such settings may be used both in current operation and as a default when subsequently powered on. However, when initially powered on no such initial conditions exist. When initially powered on during vehicle assembly, or when one or more nodes are replaced, or if the current configuration is lost, the architecture must be able to behave in a predictable, controlled manner to ensure all nodes receive power, are capable of communication and, if desired, programming. Further, the architecture must account for supplying power to the various loads distributed around the vehicle in a controlled manner to limit the possibility of instantaneous current overloads and voltage spikes.

Voltage spikes can be a particular problem. The wiring connections of the vehicle, both between nodes and between the nodes and their respective loads represent a significant amount of inductance. From elemental electricity it is known that V=LdI/dt, where L is inductance and dI/dt is the change in current through the inductor over time period dt. Sudden current changes, for example, when charging a primary battery at a high amperage when the battery lead disconnects, can cause a condition known as "load dump," characterized by very high voltages being propagated through the electrical distribution system. Similarly, were every load in a vehicle to suddenly start up at the first opportunity, load dump-like voltage spikes are likely to occur.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, be implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

FIG. 1 illustrates within a vehicle 10 a power, ground and communication architecture 100 that includes a plurality of hubs 105, 110 and 115. The hubs 105, 110 and 115 are joined by standardized wire harness segments in a web-type structure. While a plurality of the wire harness segments are shown in FIG. 1 and used to interconnect the hubs 105, 110 and 115, only one is identified as wire harness segment 120. Throughout this disclosure, reference to wire harness segment 120 in either the singular or plural refers to the one or more wire harness segments used to interconnect the hubs 105, 110 and 115. The architecture 100 also includes a plurality of power sources such as batteries 125 and 130. Additional power sources (not depicted) such as generator/alternators, capacitors, fuel cells or other alternative power sources may be employed within the architecture 100. The specific types or numbers of power sources are not critical to the structure or function of the architecture 100. The hubs 105, 110 and 115 are configured to couple to one or more other hubs 105, 110 and 115 and to devices, one of which is shown as device 132, within the vehicle 10 via additional wire harness segments 120. The particular types of devices are also not critical to the structure or function of the architecture 100, and typical devices found on a vehicle such as sensors, actuators, controllers, and the like may be coupled to the hubs.

Figure 2:
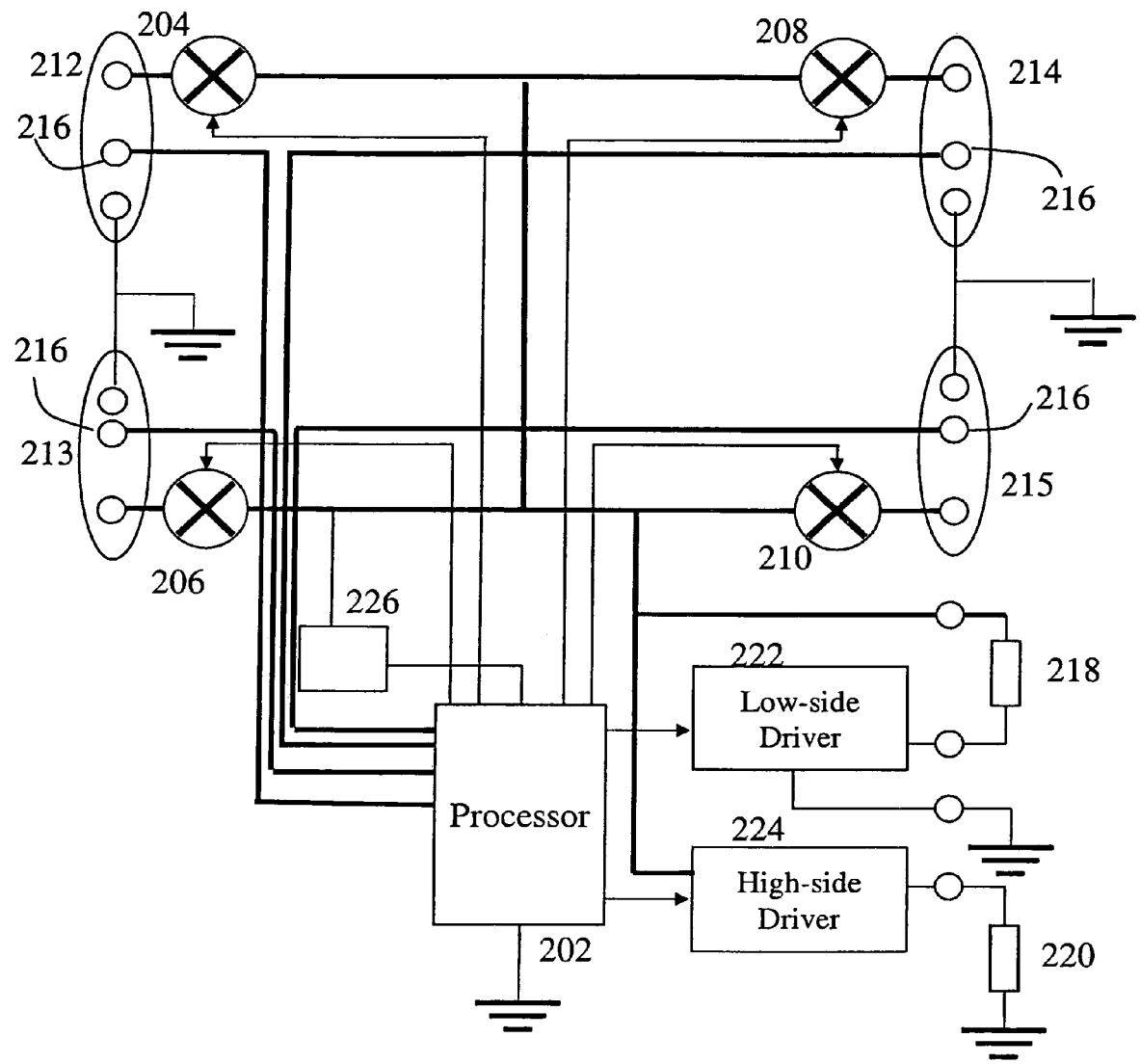
FIG. 2 is a schematic illustration of a node of the communication and power distribution architecture shown in FIG. 1.

With reference to FIG. 2, an exemplary hub or node 200 may have a processor 202, including a control program stored either in an internal memory or in an associated memory providing central intelligence. The node or hub 200 has at least one switch for controlling power flow. The node or hub 200 may be configured with four bidirectional switches 204, 206, 208, 210 arranged in a star configuration. The structure of each switch 204, 206, 208, 210 is discussed in more detail below with respect to FIG. 3. Each of the switches 204, 206, 208, 210 may be off or configured to allow power to flow in and/or out. The ports 212, 213, 214, 215 are configured for interconnecting a hub with another hub. Each port 212–215 may have a power and ground connection and a communication connection 216. A dedicated communication unit (not depicted) may be disposed in the hub or node 200 and coupled to the communication connection 216, but may be a function of the processor 202. Loads 218, 220 can be connected to a low-side driver 222 or a high-side driver 224. Different combinations of low-side 218 and high-side 220 drivers may be disposed in various embodiments. A regulator 226 allows operation of the node 200 over a wide range of voltages, especially in the case of a standby mode using a lower voltage to conserve power and reduce damaging effects associated with high voltage conditions, such as metal migration in embedded semiconductors.

A single port configuration may be used in connection with the hubs 105, 110 and 115 to connect hub-to-hub and hub-to-device. In each configuration, the hubs 105, 110 and 115 will have at least one connector cavity configured to mate with an end of a wire harness segment 120 for hub-to-hub connection.

The power management device or hub 200 has ports 212–215 for receiving electrical energy. The switches 204, 206, 208, 210 are particularly suited for receiving power as will be discussed further with respect to FIG. 3. When electrical energy is received at one of the ports 212–215 it is routed to a regulator 226. The processor 202 may then be activated.

Once active, the processor 202 is able to determine whether the electrical energy received is primary power or secondary power. In one embodiment, the processor 202 determines this by monitoring a signal from the regulator 226. If the input voltage to the regulator 226 or the input control network 304 is determined to be in a range associated with primary power or in a range associated with secondary power, the processor 202 makes the appropriate determination. In another embodiment, the processor 202 may communicate with a power source (not shown) to determine if the powder being received is primary or secondary power. Communications between elements of the overall communication and power distribution architecture are covered in more detail in the incorporated reference and are not discussed further. As discussed below, when one of the switches 204, 206, 208, 210 detects electrical energy, it configures itself as an input.

When the processor 202 determines the electrical energy is a secondary power source, it places the node in a standby mode, and waits either for further instructions via the data communication network or for a change in the power status. In one embodiment, the standby mode involves turning off any of the switches 204, 206, 208, 210 not configured as inputs as well as turning off drivers 222, 224 and instructing the regulator 226 to reduce the operating voltage of the hub 200 for saving power.

When the hub 200 determines that the electrical energy being supplied is a primary power source, the processor places the node in an active mode. In an initial power on state, or other situations where no previous programming or operational state data is available, the active mode includes configuring the switches 204, 206, 208, 210 not already configured as inputs as outputs for routing power out to one of the ports 212–215 to other connected nodes or hubs 105, 110, 115.

After configuring the ports 212–215 the processor 202, acting as a communication unit, will typically wait in the active mode for instructions from a central power controller (not depicted). Operational instructions are received via the data network for directing the node 200 and the processor 202 to configure the ports 212–215 and for activating drivers 222, 224. The node 200 or the processor 202 thereof, may be programmed to a number of pre-programmed operational modes that are set by the operational instructions. The operational mode may include falling back to the standby mode, remaining in the active mode or assuming several other operating modes. For example, another mode may be a fault detection mode, where power and loads are variously pulsed off and on while monitoring current drain to determine shorts and opens. Should a problem be detected, a fault management mode may then change the routing of power to another path to circumvent the problem. Load sequencing allows initially powering on loads 218, 220 in a manner coordinated either by the processor 202 according to predetermined instructions or when requested by the central controller. Additionally, overall power drain may be managed by sequentially power cycling non-critical devices, such as diagnostic units. Another operational mode may be a load shed mode. Load shed is useful in many circumstances, for example, one embodiment may temporarily turn off power to accessories such as the air conditioner when a substantial amount of power is needed for priority functions, such as rapid acceleration. The processor 202, again acting as a communication unit, may send the status of the hub 200 on either a periodic basis, an interrupt basis, or a polled basis.

The elements of the node or hub 200 are known and available. The processor can be a simple microcontroller such as those available from Motorola, Inc, or another processor. The coding for the processor may be done in a high level language such as "C" and compiled for the processor or microcontroller used. The voltage regulator 226 is a commodity part available from a number of suppliers or may be designed from discrete components by one of ordinary skill in the art. The high-side and low-side drivers 222, 224 are selected according to the load 218, 220 and may range from a simple transistor to an electro-mechanical relay. The bi-directional switches 204, 206, 208, 210 are discussed below.

Figure 3:
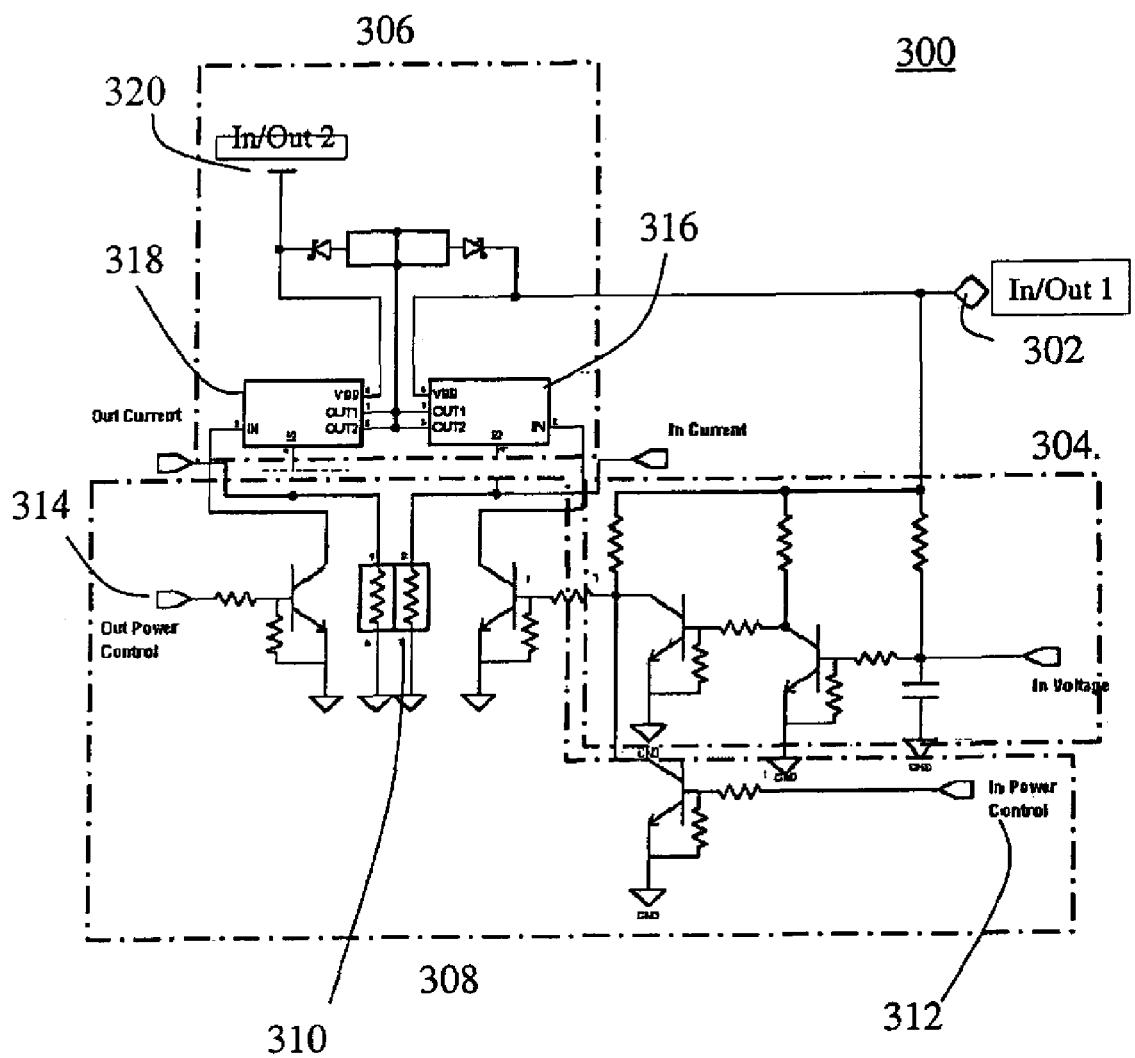
FIG. 3 is a detailed schematic illustration of a switch element of a node of the communication and power distribution architecture shown in FIG. 1.

Referring to FIG. 3, a schematic illustration of one of the switch elements of a node of the communication and power distribution architecture is discussed and described. An exemplary switch 300 suitable for use in hub 200 has an in/out 1 connection 302 that is connected to both a sense and input control network 304 and a switch matrix 306. The switch 300 also has a power control circuit 308. The power control circuit 308 also has an optional current sensing circuit 310. The circuit 304 has power control inputs 312 and 314 for setting the direction of current flow. The power is switched by an input switch module 316 and an output switch module 318. The output switch module is connected to the in/out 2 connection 320. Connection 320 is part of a star connection of similar outputs of the other switch elements in the node 200.

In operation, initial power applied to the in/out 1 connection 302 powers the sense and logic circuit 304. When powered, the sense and logic circuit 304 turns on the input switch module 316, supplying power to the in/out 2 connection and the regulator 226. After power is supplied to the regulator 226 and processor 202 the two switch modules 316, 318 are independently controllable and can be used to set the direction of current flow between in/out 1 302 and in/out 2 320.

Given this circuit configuration, a circuit designer or electrical engineer of ordinary skill can determine component types and values appropriate to the design environment of a particular application. In one embodiment, the transistors of the circuit are MMUN2211 devices from ON Semiconductor and the switch modules 316, 318 are BTS6143 devices from Siemens Corporation.

Figure 4:
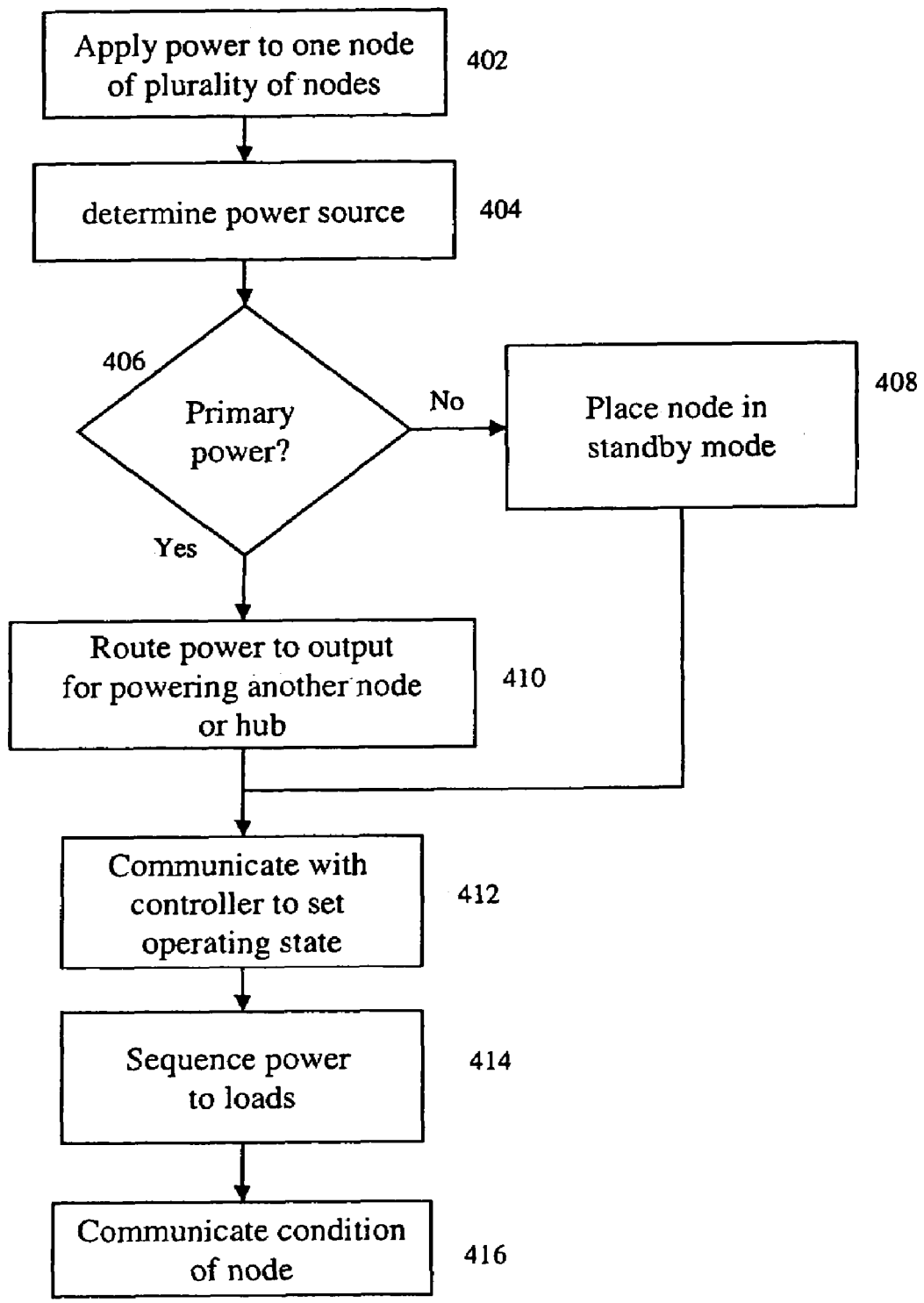
FIG. 4 is a flow chart of the power on sequence for a communication and power distribution architecture.

FIG. 4, a flow chart of the power on sequence for a communication and power distribution architecture is discussed and described. The method details a way of sequentially starting a plurality of nodes 200 when no previous state data is available. This may be the case, for example, upon initial power up during manufacturing or after the introduction of one or more new nodes 200 in a repair situation. Power is applied during step 402 to a first node 200, generally the node closest to the power source, such as a battery 125, 130. The node 200 may then communicate with the power source to determine during step 404 the nature of the power, if the node 200 is not able to determine the power type on its own, as discussed above. The power may be one of at least two kinds, a primary power or a secondary power. When the power is a secondary power, the no branch of step 406 is followed and the node 200 is placed during step 408 in a standby mode to await further instructions. When the power is determined to be a primary power, the yes branch of step 406 is followed. Power is routed during step 410 to another node of the network 100, generally a node downstream from the node closest to the battery 125, 130. It can be seen that this asynchronous application of power will rapidly cascade through a web-type network of the type shown in this embodiment. While other embodiments can be envisioned, where some nodes 200 may be left in a standby mode, it is most often the case where all nodes will receive primary power with a minimum number of "hops" from the source of primary power such as batteries 125, 130. The node 200, whether in an active mode or in a standby mode, communicates during step 412 with a controller, either a central controller or a processor 202 from one of the nodes to receive instructions for setting an operating state. In some cases, the operating state will relate to powering during step 414 loads 218, 220 in a sequential or other predetermined manner. The communication capability of the node 200 may be used to communicate during step 416 the condition of the node 200 as well as any fault or maintenance conditions determined on the periphery of the node 200. As discussed above, a central controller can use the power, ground and communication architecture 100 to power loads 218, 220 and other loads to reduce the instantaneous change in power supplied by the power distribution network, that may induce an undesirable load dump-like condition.

The apparatus and methods discussed above, and the inventive principles thereof, are intended to and will enhance the distribution of power in vehicles. An orderly power up sequence for even first time participants in such a network greatly reduces the programming, manually intervention, and potential failures of other methods of initializing such a power distribution architecture. Using the principles determining power type and either forwarding power or waiting in standby will not only simplify the use of such power distribution schemes but bring a new and novel method for managing loads in a vehicle. Users benefit by being able to replace nodes without difficult pre-programming steps. Manufacturers can benefit by not requiring the expensive and cumbersome pre-programming of entire networks of devices during vehicle manufacture. While waiting in standby at a reduced power level is known, it is believed that this approach uniquely utilizes the nature of the power to determine whether to go to standby mode or to forward power to another network element.

It is expected that these embodiments or others in accordance with the present invention will have application to many portable image capture devices. The disclosure extends to the constituent elements or equipment comprising such systems and specifically the methods employed thereby and therein.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

I claim:

1. A power management device for use in a power distribution network of a vehicle comprising:
    an input; and
    a logic unit coupled to the input, wherein when the logic unit determines a presence of an electrical energy at the input the logic unit places the power management device in one of a standby mode and an active mode, the logic unit in communication with a controller operable to communicate with at least one of a plurality of power distribution nodes, the controller operable to set an operational mode in each of the at least one power distribution nodes.

2. The power management device of claim 1 wherein the logic unit places the power management device in the standby mode when the logic unit determines the electrical energy is from a secondary power source.

3. The power management device of claim 1 wherein the logic unit places the power management device in the active mode when the logic unit determines the electrical energy is from a primary power source.

4. The power management device of claim 3 wherein when the power management device is in the active mode, the power management device routes the primary power to an output port, the output port for connection to another power management device in the power distribution network.

5. The power management device of claim 1 wherein the power management device operates at a lower voltage when in the standby mode than when in the active mode.

6. The power management device of claim 1 further comprising:
    a circuit, coupled between the input and the logic unit, responsive to the electrical energy at the input, the circuit for supplying power to the logic unit.

7. The power management device of claim 1 further comprising a communication unit for receiving an instruction related to an operational mode wherein the power management device is responsive to said instruction.

8. The power management device of claim 7 wherein the operational mode comprises one of the active mode, the standby mode, a fault detection mode, a fault management mode, a load sequencing mode and a load shed mode.

9. The power management device of claim 7 wherein the communication unit is further operable to send a signal indicative of a status of the power management device.

10. A method for sequentially starting a plurality of nodes in a power distribution network comprising:
    applying a power to a first node of the plurality of nodes;
    determining that the power is from a primary power source; and when the power is a primary power source,
    routing the primary power to a second node of the plurality of nodes, and operating a controller to set an operational mode in each of the nodes.

11. The method of claim 10 further comprising:
    applying the power to each of the plurality of nodes in the power distribution network.

12. The method of claim 10 further comprising:
    determining that the power is from a secondary power source; and
    waiting in a standby mode when the power is from the secondary power source.

13. The method of claim 10 further comprising:
    communicating with at least one of the first and second nodes to set an operating state in the at least one of the first and second nodes.

14. The method of claim 10 further comprising:
    communicating with at least one of the first and second nodes to monitor a condition of the at least one of the first and second nodes.

15. The method of claim 10 further comprising:
    powering in a sequential fashion a plurality of loads coupled to the plurality of nodes to reduce an instantaneous change in power supplied by the power distribution network.

16. The method of claim 10 wherein determining that the power is the primary power further comprises communicating with a power source to determine that the power source is a supplier of the primary power.

17. A vehicle arranged and constructed for using a power management distribution network comprising:
    a plurality of power distribution nodes;
    a conductive infrastructure connecting the power distribution nodes;
    a plurality of power sources coupled to at least one of the plurality of power distribution nodes, wherein the at least one of the plurality of power distribution nodes determines that a one of the plurality of power sources is supplying a primary power, and routes the primary power source to another of the plurality of power distribution nodes; and a controller operable to communicate with each of the plurality of power distribution nodes, the controller for setting an operational mode in each of the plurality of power distribution nodes.

18. The vehicle of claim 17 wherein at least one of the plurality of power distribution nodes waits in a standby mode when connected to a secondary power source.

19. The vehicle of claim 17 wherein a one of the plurality of power sources is operable to communicate its operational mode to a one of the plurality of power distribution nodes.

20. The vehicle of claim 19 wherein the operational mode comprises one of an active mode, a standby mode, a fault detection mode, a fault management mode, a load sequencing mode and a load shed mode.

* * * * *